(12) United States Patent
Thiele et al.

(10) Patent No.: US 9,577,517 B2
(45) Date of Patent: Feb. 21, 2017

(54) STARTUP CLAMP CIRCUIT FOR NON-COMPLIMENTARY DIFFERENTIAL PAIR IN DCDC CONVERTER SYSTEM

(71) Applicant: Texas Instruments Deutschland GmbH, Freising (DE)

(72) Inventors: Gerhard Thiele, Dachau (DE); Erich Bayer, Thonhausen (DE)

(73) Assignee: Texas Instruments Deutschland GmbH, Freising (DE)

( * ) Notice: Subject to any disclaimer, the term of this patent is extended or adjusted under 35 U.S.C. 154(b) by 215 days.

(21) Appl. No.: 14/322,550

(22) Filed: Jul. 2, 2014

(65) Prior Publication Data

US 2015/0123638 A1 May 7, 2015

Related U.S. Application Data

(60) Provisional application No. 61/901,319, filed on Nov. 7, 2013.

(51) Int. Cl.
*H02M 3/155* (2006.01)
*H02M 3/156* (2006.01)
*H02M 1/36* (2007.01)

(52) U.S. Cl.
CPC .............. *H02M 3/156* (2013.01); *H02M 1/36* (2013.01)

(58) Field of Classification Search
CPC .......... H02M 3/155; H02M 3/06; H02M 1/08; H02M 3/156; H02M 1/36
USPC ........................................................ 323/293
See application file for complete search history.

(56) References Cited

U.S. PATENT DOCUMENTS

| | | | | |
|---|---|---|---|---|
| 7,034,586 B2* | 4/2006 | Mehas | ................... | H02M 1/36 323/901 |
| 7,038,514 B2* | 5/2006 | Leith | ...................... | H02M 1/36 323/901 |
| 7,135,841 B1* | 11/2006 | Tomiyoshi | ............ | H02M 3/156 323/224 |
| 7,400,120 B2* | 7/2008 | Hashimoto | ........... | H02M 3/158 307/28 |
| 8,976,549 B2* | 3/2015 | Genannt Berghegger | ............ | H02M 1/36 363/49 |
| 9,030,248 B2* | 5/2015 | Kim | ................. | H03K 19/00369 326/62 |
| 9,300,212 B2* | 3/2016 | Notman | .............. | H02M 3/1588 |

(Continued)

*Primary Examiner* — Timothy J Dole
*Assistant Examiner* — Htet Z Kyaw
(74) *Attorney, Agent, or Firm* — William B. Kempler; Chares A. Brill; Frank D. Cimino

(57) ABSTRACT

A DCDC converter includes a transconductance amplifier, a comparator, a current driving component, an output impedance, a switch, a clamp resistor and a p-channel FET. The transconductance amplifier outputs a transconductance current and a switch control signal. The comparator has a two n-channel FET inputs forming a differential pair and outputs a compared signal. The current driving component generates an output current based on the compared signal. The output impedance component generates an output DC voltage based on the output current. The switch is between the two n-channel FETs and can open and close based on the switch control signal. The clamp resistor is arranged in series with the switch. The p-channel FET is in series with the clamp resistor and is controlled by the output DC voltage.

19 Claims, 8 Drawing Sheets

(56) References Cited

U.S. PATENT DOCUMENTS

| | | | | |
|---|---|---|---|---|
| 2006/0033481 A1* | 2/2006 | Thiele | ............ | G05F 3/262 |
| | | | | 323/266 |
| 2008/0084720 A1* | 4/2008 | Thiele | ............ | H02M 3/07 |
| | | | | 363/60 |
| 2009/0096510 A1* | 4/2009 | Ogiwara | ............ | G05F 3/30 |
| | | | | 327/539 |
| 2011/0148381 A1* | 6/2011 | Kwan | ............ | H02M 3/156 |
| | | | | 323/285 |
| 2013/0069613 A1* | 3/2013 | Nakase | ............ | H02M 3/156 |
| | | | | 323/284 |
| 2013/0300383 A1* | 11/2013 | Bayer | ............ | G05F 1/595 |
| | | | | 323/271 |

\* cited by examiner

STARTUP CLAMP CIRCUIT FOR NON-COMPLIMENTARY DIFFERENTIAL PAIR IN DCDC CONVERTER SYSTEM

The present application claims priority from: U.S. Provisional Application No. 61/901,319 filed Nov. 7, 2013, the entire disclosure of which is incorporated herein by reference.

BACKGROUND

The present invention is generally drawn to a comparator driven by a transconductance amplifier. More specifically, the present invention is drawn to a DCDC converter including a comparator driven by a transconductance amplifier.

A DCDC converter is an electronic circuit that converts a source of direct current (DC) from one voltage level to another. One conventional type of DCDC converter includes a transconductance amplifier, whose output is used as one of the inputs to a comparator. The other input of the comparator is based on the output voltage generated by the DCDC converter.

In some conventional DCDC converters that include a transconductance amplifier-driven comparator, the comparator input includes a complimentary differential pair, wherein a pair of p-channel field effect transistors (p-FETs) and a pair of n-channel field effect transistors (n-FETs) are used. Such a comparator is very complex, requires a relatively large amount current for biasing, larger silicon area and has a complex transfer function in the middle range of operation.

In some other conventional DCDC converters that include a transconductance amplifier-driven comparator, the comparator input includes a differential pair of p-FETs. These types of DCDC converters support operation close to the lower rail of the comparator.

What is needed is a DCDC converter that includes a transconductance amplifier-driven comparator that does not have the disadvantages of the conventional systems discussed above.

BRIEF SUMMARY

The present invention provides a DCDC converter that includes a transconductance amplifier-driven comparator that does not have the disadvantages of the conventional systems discussed above.

An aspect of the present invention is drawn to a DCDC converter includes a transconductance amplifier, a comparator, a current driving component, an output impedance, a switch, a clamp resistor and a p-channel FET. The transconductance amplifier outputs a transconductance current and a switch control signal. The comparator has a two n-channel FET inputs forming a differential pair and outputs a compared signal. The current driving component generates an output current based on the compared signal. The output impedance component generates an output DC voltage based on the output current. The switch is between the two n-channel FETs and can open and close based on the switch control signal. The clamp resistor is arranged in series with the switch. The p-channel FET is in series with the clamp resistor and is controlled by the output DC voltage.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

A DCDC converter in accordance with aspects of the present invention includes a transconductance amplifier that drives one input of a comparator. The comparator includes a differential pair of n-channel FETs (n-FETs) for its inputs. The output of the DCDC converter is based on the output of the comparator. The second input of the comparator is based on the output of the DCDC converter.

In general, the DCDC converter starts in an open loop operation, wherein the output voltage is zero and is fed to the positive input of the comparator. This open loop operation continues until the positive input to the comparator reaches a predetermined level. The transconductance amplifier will provide a given current. To prevent a delta voltage on the input of the comparator from getting too high, in the open loop current limit startup case, a clamp resistor is disposed between the two inputs of the comparator to limit the comparator delta input voltage. This clamp resistor prevents an overshoot in the output voltage after startup, when the system changes from open loop to closed loop operation. It is called a "clamp" resistor because it limits the voltage drop across the input differential pair of the comparator.

The negative input of the comparator is a voltage generated from the current of the transconductance amplifier through the clamp resistor. At startup, the n-FET differential pair of the comparator would not work and the output of the comparator would be undefined. To address this issue, a p-FET is included in series with the clamp resistor to provide an initial bias sufficient to drive the comparator at low voltages—including startup.

A switch, controlled by the transconductance amplifier disconnects the clamp resistor and p-FET when the DCDC converter starts the closed loop operation and the output voltage is in regulation.

Aspects of the present invention will be explained in greater detail with reference to FIGS. 1-10.

Figure 1:
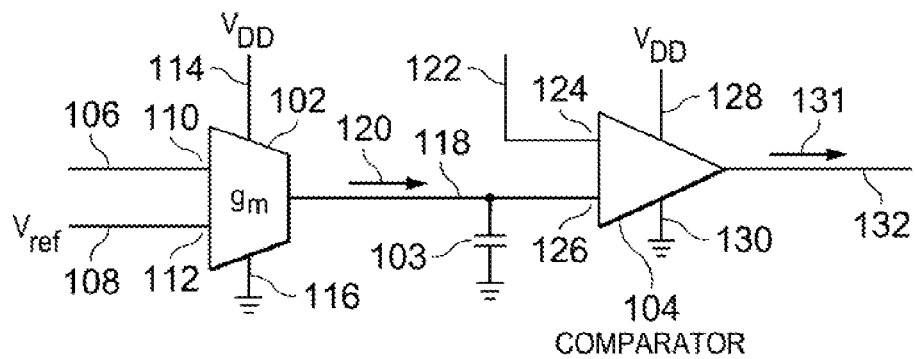
FIG. 1 illustrates a conventional comparator driven by a transconductance amplifier.

FIG. 1 illustrates a conventional comparator 104 driven by a transconductance amplifier 102.

As shown in the figure, transconductance amplifier 102 receives a first input from a line 106 at input 110 and receives a reference voltage $V_{ref}$ from a line 108 at input 112. Transconductance amplifier 102 receives an upper supply voltage $V_{DD}$ from a line 114 and has a line 116 to ground. Transconductance amplifier 102 outputs a transconductance current 120 to a line 118. Transconductance amplifier 102 produces transconductance current 120 based on the differential input voltage between input 110 and input 112. A compensation capacitor 103 is disposed between line 118 and ground. Compensation capacitor acts as a low pass filter and provides loop compensation.

Comparator 104 receives a first input from a line 122 at input 124 and receives a second input from a line 118 at input 126. Comparator 104 receives an upper supply voltage $V_{DD}$ from a line 128 and has a line 130 to ground. Comparator 104 outputs a compared signal 131 to a line 132.

With respect to operation in a DCDC converter, line 122 may include a signal based on a generated output voltage. In this manner, compared signal 131 is based on comparison of values at input 124 and input 126. In other words, the output of comparator 104 is based on a difference between the generated output voltage and a voltage associated with transconductance current 120. This will be described in greater detail with reference to FIG. 2.

Figure 2:
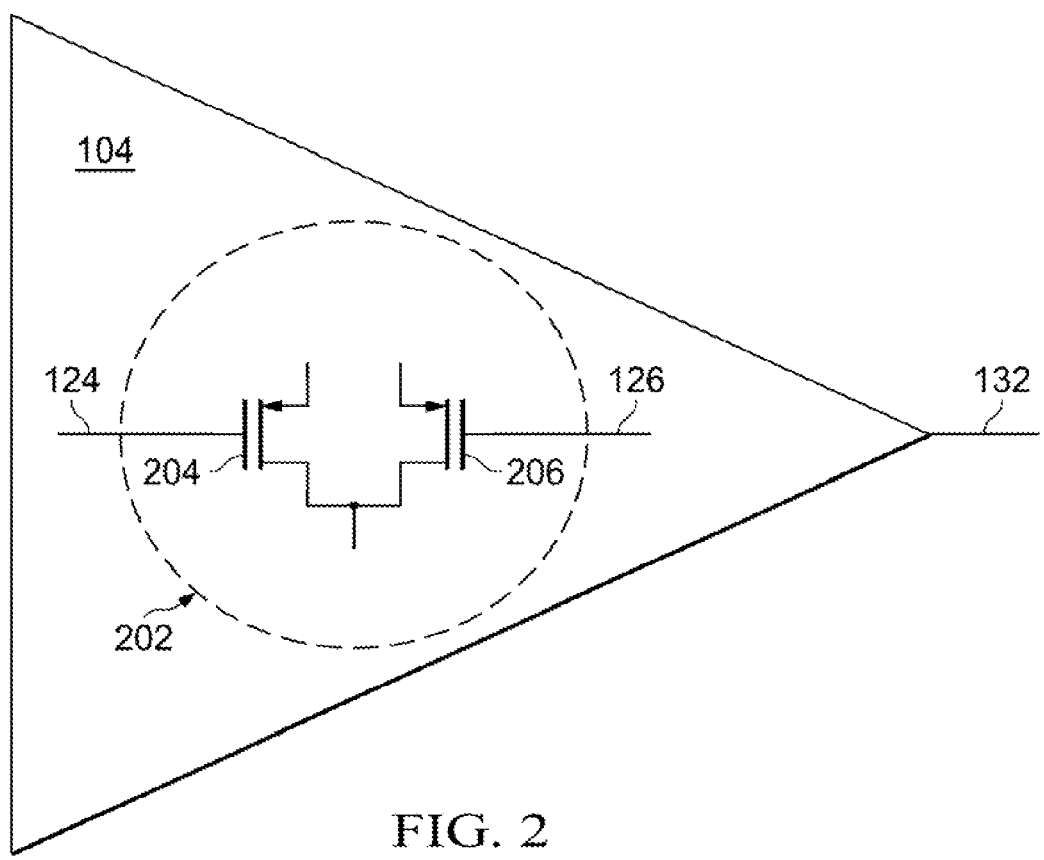
FIG. 2 illustrates an exploded view of a portion of the comparator of FIG. 1.

FIG. 2 illustrates an exploded view of a portion of comparator 104 of FIG. 1.

A portion of the circuitry of comparator 104 is not shown. What is shown is the input portion, which includes a differential pair 202. Differential pair 202 includes a first p-channel field effect transistor (p-FET) 204 and a second p-FET 206. The gate of p-FET 204 is driven by a signal from line 124, whereas the gate of p-FET 206 is driven by a signal from line 126.

When the inputs to differential pair 202 are too high (close to VDD), there is insufficient bias to initiate operation of comparator 104. To overcome this issue, in a comparator in accordance with aspects of the present invention, n-FETs are used for inputs of the differential pair. This will now be described in greater detail with reference to FIG. 3.

Figure 3:
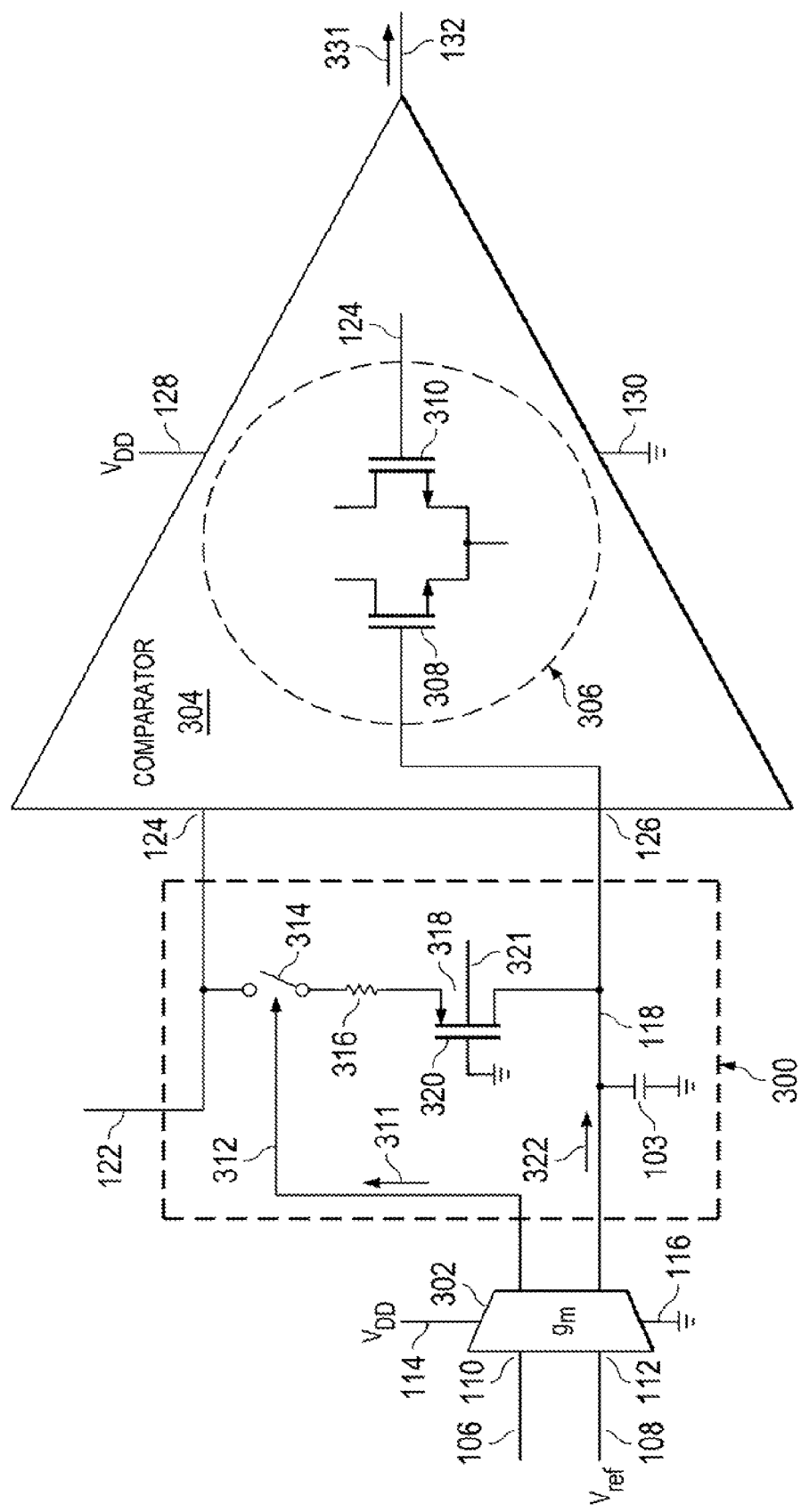
FIG. 3 illustrates a comparator driven by a transconductance amplifier with a startup clamp circuit in accordance with aspects of the present invention.

FIG. 3 illustrates a comparator 304 driven by a transconductance amplifier 302 with a startup clamp circuit 300 in accordance with aspects of the present invention.

As shown in the figure, transconductance amplifier 302 is similar to transconductance amplifier 102 of FIG. 1, but further outputs a switch control signal 311 to a line 312. Further, transconductance amplifier 302 outputs a transconductance current 322 to line 118.

Comparator 304 is similar to comparator 104 of FIGS. 1 and 2, but differs in that comparator 304 has a differential pair 306 as opposed to differential pair 202. Differential pair 306 includes an n-FET 308 and an n-FET 310, as opposed to the p-FETs in differential pair 202 of FIG. 2. The gate of n-FET 308 is driven by a signal from line 126, whereas the gate of n-FET 310 is driven by a signal from line 124.

Comparator 304 receives a first input from line 122 at input 124 and receives a second input from line 118 at input 126. Comparator 304 receives an upper supply voltage $V_{DD}$ from line 128 and has a line 130 to ground. Comparator 304 outputs a compared signal 331 to line 132, wherein the compared signal is based on a difference between the voltages at n-FET 310 and n-FET 308.

Startup clamp circuit 300 includes a switch 314, a clamp resistor 316 and a p-FET 318. Switch 314 is arranged between input 124 and input 126 between line 122 and line 118. Clamp resistor 316 is arranged in series with switch 314 and p-FET 318 is arranged in series with clamp resistor 316. Switch 314 is controllably actuated via switch signal 311 on line 312. The gate 320 of p-FET 318 is connected to ground.

For purposes of discussion, presume that the voltage at input 124 is zero. Switch control signal 311 may close switch 314 such that transconductance current 322 may create a voltage drop across clamp resistor 316 and p-FET 318. The voltage drop across clamp resistor 316 and p-FET 318 enable transconductance amplifier to be used to drive comparator 304 even when the voltage at input 124 is zero. More particularly, a comparator having n-FET inputs such as differential pair 306 may be started with a transconductance amplifier. Thus any circuit that may use such a comparator driven by a transconductance amplifier may employ aspects of the present invention. Such non-limiting example circuits that are DCDC converters will now be further described with reference to FIGS. 4-10.

Figure 4:
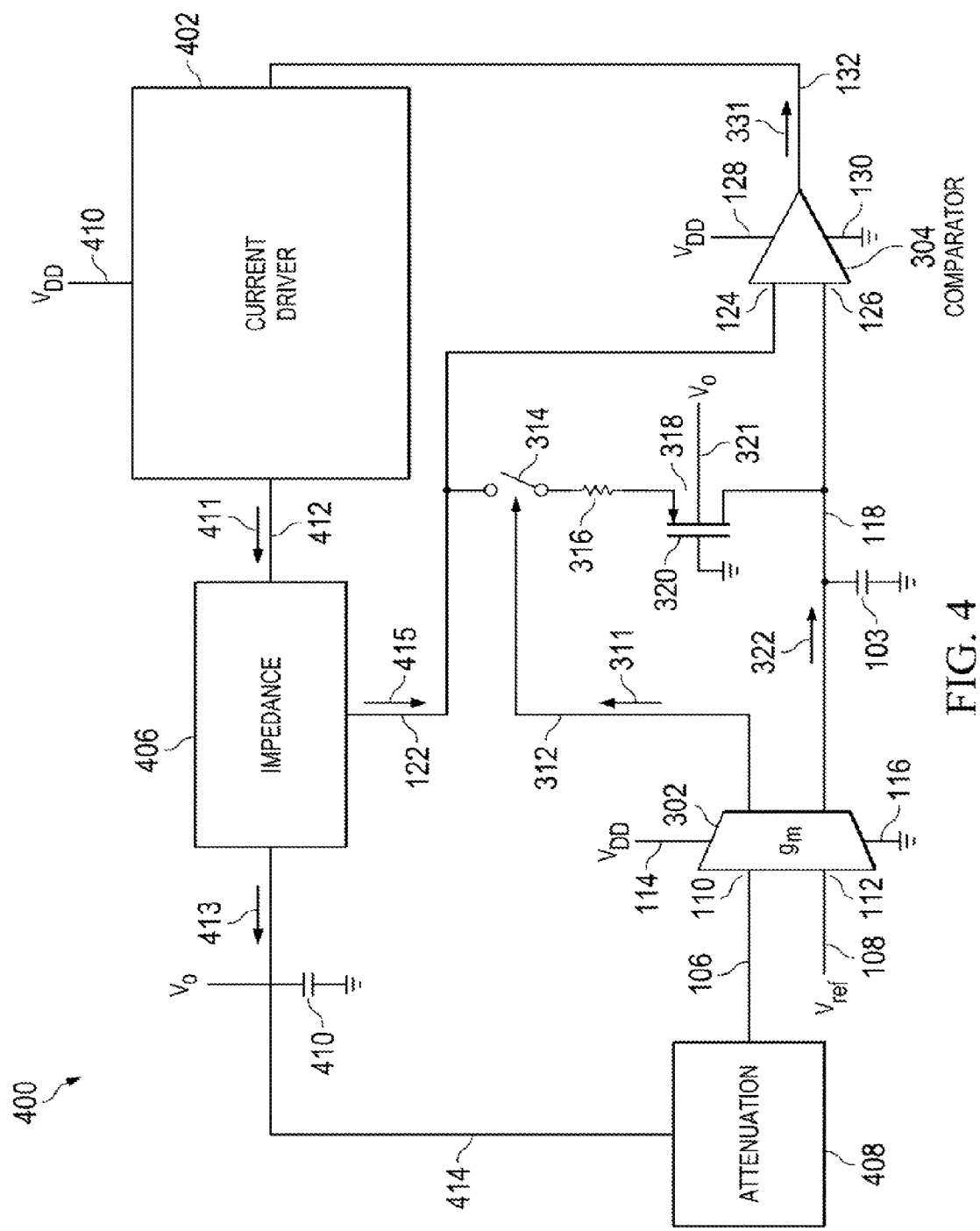
FIG. 4 illustrates an example DCDC converter in accordance with aspects of the present invention.

FIG. 4 illustrates an example DCDC converter 400 in accordance with aspects of the present invention.

As shown in the figure, DCDC converter 400 includes comparator 304, driven by transconductance amplifier 302, and startup clamp circuit 300 of FIG. 3, in addition to a current driving component 402, an output impedance component 406, an attenuation component 408 and a capacitor 410.

Current driver 402 is arranged to receive compared signal 331 from line 132 and to output an output current 411 through a line 412. Current driver 410 is powered by a supply voltage $V_{DD}$ from a line 410. Current driver 402 generates output 411, which is used to generate a voltage for input 124 during open loop operation and which is used for $V_o$ during closed loop operation.

Impedance component 406 is arranged to receive output current 411 via line 412. Impedance component 406 is arranged to provide an output voltage, $V_o$, and an output current 413 to a line 414. Impedance component is additionally arranged to provide a current 415 to line 122, and a positive input voltage, $V_{IN_p}$, to input 124 of comparator 304 via line 122. In an open-loop mode, wherein DCDC converter 400 is starting up, impedance component 406 provides all output to input voltage, $V_{IN_p}$, to input 124 via line 122. As will be explained in greater detail later, when the voltage provided to input 124 is greater than the voltage provided to input 126, DCDC converter 400 will operate in a closed loop mode, wherein impedance component 406 provides output voltage, $V_o$, to line 414.

Capacitor 410 acts as a high pass filter and is connected to ground.

Attenuation component 408 is arranged to receive $V_o$ from impedance component via line 414. Attenuation component 408 is operable to attenuate $V_o$ and to output a portion of $V_o$, based on the attenuation, to line 106.

In operation, at startup, $V_o$ is zero and input 110 to transconductance amplifier 302 is zero. Therefore, transconductance current 322 is solely based on the voltage provided by $V_{ref}$ at input 112. Because the voltage at input 110 is zero, more particularly because the voltage difference between input 110 and input 112 is lower than a predetermined threshold, switch control signal 311 closes switch 314. Concurrently at startup, the voltage at input 124 of comparator 304 is zero.

At startup, transconductance current 322 will provide a voltage drop across clamp resistor 316. However, this voltage drop across clamp resistor 316 will be insufficient, by itself, to actuate the n-FET differential pair in comparator 304. P-FET transistor 318 generates an additional voltage offset between input 124 and input 126 of comparator 304. As such, transconductance current 322 across clamp resistor 316 and p-FET 318 provides sufficient voltage at input 126 to actuate the n-FET differential pair in comparator 304, such that comparator 304 can output compared signal 331.

Compared signal 331 drives current driver 402 to generate output current 411. The voltage from output current 411 through impedance component 406 is fed back to input 124 of comparator 304. This closed-loop operation of DCDC converter 400 continues until the voltages at input 124 and at input 126 are above a predetermined threshold.

Once the voltages at input 124 and at input 126 are above a predetermined threshold, switch control signal 311 opens switch 314, thereby removing the voltage bias provided by clamp resistor 316 and p-FET 318, and DCDC converter is operating in an open loop. Clamp resistor 316 increases the large signal response when switch control signal 311 opens switch 314. In an open loop operation, $V_o$, is output. Further, current driver 402 maintains output current 411 between a predetermined upper limit and a predetermined lower limit in order to maintain a constant $V_o$.

The specific inventive aspects of the n-FET differential pair inputs of comparator 304, and the combination of clamp resistor 316 and p-FET 318 will now be described with additional reference to FIGS. 5-7.

As mentioned above, one inventive aspect is drawn to a combination of clamp resistor 316 in series with p-FET 318. Merely including p-FET 318, without clamp resistor 316, would enable comparator 304 to turn on. However, if clamp resistor 316 were not included, the resulting $V_o$ of DCDC converter 400 would include a large over-shoot once the closed-loop mode begins, as will be discussed in greater detail later. Further, merely including clamp resistor 316, without p-FET 318, would additionally enable comparator 304 to turn on. However, if p-FET 318 were not included, the resistance of clamp resistor 316 must be larger to compensate for the missing voltage provided by p-FET 318. This larger resistance will result in an even larger over-shoot once the closed-loop mode begins. Before the overshoot is discussed, the actual input voltages of comparator 304 should be discussed, with reference to FIG. 5.

Figure 5:
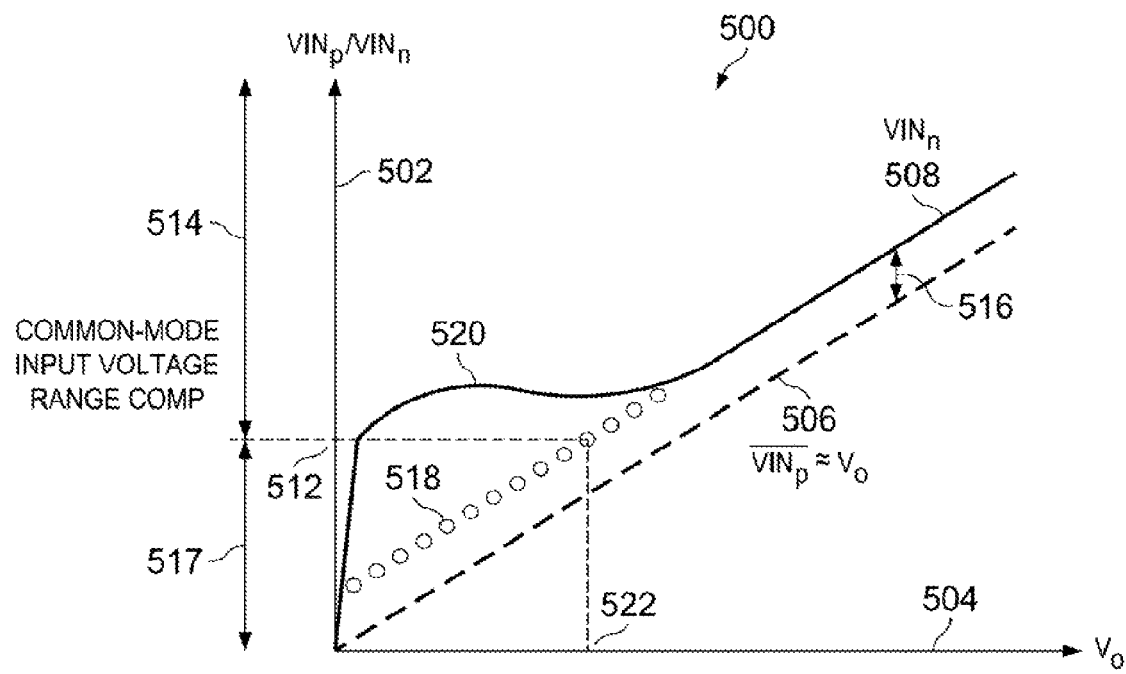
FIG. 5 is a graph of the input voltages to the comparator of FIG. 4 as a function of the output voltage.

FIG. 5 is a graph 500 of the input voltages to comparator 304 as a function of $V_o$.

As shown in FIG. 5, graph 500 includes a y-axis 502, an x-axis 504, a function 506 and a function 508. Y-axis 502 is dimensionless and corresponds to $V_{IN_p}/V_{In_n}$, i.e., the ratio of the voltage at input 124 to the voltage at input 126. X-axis 504 is in volts and corresponds to $V_o$. Function 506 corresponds to $V_{IN_p}$, the voltage at input 124, whereas function 508 corresponds to $V_{IN_n}$, the voltage at input 126.

Returning to FIG. 4, comparator 304 outputs compared signal 331 based on a difference between the voltage at input 124 and the voltage at input 126. Returning to FIG. 5, this difference is indicated by double arrow 516. Comparator 304 will only be able to output compared signal 331 when the voltage at input 126 is above a predetermined threshold. In particular, as shown in FIG. 3, if the voltage at input 126 is insufficient to actuate n-FET 308, differential pair 306 will not turn on. This is reflected in FIG. 5, wherein point 512 on y-axis 502 is the threshold voltage for actuating n-FET 308. As shown by double arrow 514, the voltages above point 512 on y-axis 502 are the common-mode input voltage range, wherein comparator 304 will output compared signal 331. Double arrow 516 indicate the voltages below point 512 on y-axis 502, wherein comparator 304 will not output compared signal 331. It should further be noted that the voltage at input 126 drastically increases until point 512. At that point, there will be an immediate voltage drop, once current starts to flow.

Returning to FIG. 4, at startup, switch 314 is closed and clamp resistor 316 and p-FET 318 provide a voltage drop by way of transconductance current 322. This voltage drop is provided to input 126. As shown in FIG. 5, this voltage drop corresponds to point 512. Without p-FET 318, the voltage at input 126 would follow along dotted segment 518, which is below the common mode input voltage range as indicated by double line 514. Therefore, without clamp resistor 316 and p-FET 318, comparator 304 would not start. The addition of clamp resistor 316 and p-FET 318 provides a bias as shown by portion 520 of function 508, which enables comparator 304 to start.

Returning to FIG. 4, once started, output current 411 is zero. As such, $V_o$ and the voltage provided to input 124 is additionally zero. Therefore, transconductance current 322 generates a voltage from clamp resistor 316 and p-FET 318 at input 126, which is larger than the voltage provided to input 124. In this situation, wherein the voltage at input 124 is lower than the voltage at input 126, the output of comparator 304 will be low. As the output of comparator 304 increases, $V_o$ increases, such that the voltage at input 110 of transconductance amplifier 302 increases.

At a predetermined threshold, the difference between voltage at input 110 and the voltage at input 112, i.e., the voltage provided by $V_{ref}$ 108, enables transconductance amplifier 302 to output transconductance current 322 such that the voltage at input 126 is less than the voltage at input 124.

At this point, $V_o$ is sufficiently high such that the voltage drop across clamp resistor 316 and p-FET 318 is not needed for comparator 304 to operate. This voltage is represented at point 522 in FIG. 5. At this point, transconductance amplifier 302 outputs switch control signal 311 to open switch 314. With switch 314 open, there is no current through clamp resistor 316 or p-FET 318.

Another inventive aspect is drawn to comparator 304 having two n-FETs as inputs for the differential pair. The n-FET differential pair, in conjunction with clamp resistor 316 and p-FET 318 enables comparator 304 to start and to operate close to ground. As discussed above with reference to FIG. 2, a conventional manner of operating a DCDC converter might include using a comparator having p-FETs for its input differential pair, which would only enable the comparator to operate close to $V_{DD}$. Returning to FIG. 4, suppose for the purposes of discussion that comparator 304 in DCDC converter 400 was replaced with comparator 104 of FIG. 2. In such a case, comparator 104 would be operate close to the upper rail, which in this case is $V_{DD}$. On the other hand, if comparator 104 was modifies such that it included n-FETs for its input differential pair, then it might operate close to ground. However, if comparator 104 included n-FETs for its input differential pair and operated close to ground, then, as shown in FIG. 5, the DCDC converter 400 would not operate in the common-mode, i.e., it would not turn on.

Another conventional manner of operating a DCDC converter might include using a comparator having a complementary input differential pair i.e., a differential pair of n-FETs and a differential pair of p-FETs. Returning to FIG. 3, if the inputs to differential pair 306 were an n-FET and a p-FET (as opposed to n-FET 308 and n-FET 310), then comparator 304 would be operate between $V_{DD}$ and ground. However, such a comparator is much more complex, require much more current for biasing and have a complex transfer function in the middle range of operation.

Therefore, in accordance with aspects of the present invention, a DCDC converter is provided, whose comparator is able to operate close to its upper supply rail, e.g., $V_{DD}$, and is able to start, without using a complementary input differential pair. The DCDC converter in accordance with aspects of the present invention is realized by adding a p-FET in series with the clamp resistor, between the n-FET inputs of the comparator.

As mentioned above, the p-FET in conjunction with the clamp resistor reduces overshoot in $V_o$ when the DCDC converter starts the open-loop mode. This will be described in greater detail with reference to FIG. 6.

Figure 6:
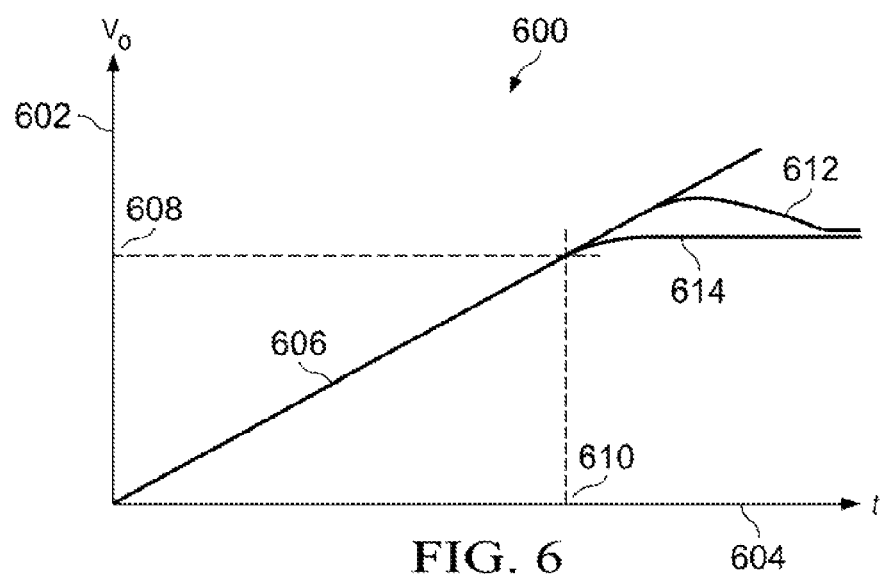
FIG. 6 is a graph showing the output voltage as a function of time in a DCDC converter in accordance with aspects of the present invention as compared to a conventional DCDC converter.

FIG. 6 is a graph showing $V_o$ as a function of time in DCDC converter 400 in accordance with aspects of the present invention as compared to a conventional DCDC converter.

As shown in FIG. 6, graph 600 includes a y-axis 602, an x-axis 404, a function 606, a function 612 and a function 614. Y-axis 502 is in volts and corresponds to $V_o$. X-axis 504 corresponds to time and is in milliseconds. Function 606 corresponds to a theoretical $V_o$ as a function of time if DCDC converter 400 were able to output a voltage beginning at startup. Function 612 corresponds to $V_o$ as a function of time for a DCDC converter similar to DCDC converter 400, but without clamp resistor 316. Function 614 corresponds to $V_o$ as a function of time for DCDC converter 400.

With additional reference to FIG. 4, as discussed previously, DCDC converter 400 initially operates in a closed-loop mode, wherein impedance component 406 does not provide $V_o$ to line 414. Dotted line 608 represents the $V_o$ wherein DCDC converter 400 starts to operate in the open loop mode. Dotted line 610 represents that time at which converter 400 starts to operate in the open loop mode.

If DCDC converter 400 were able to output a sustainable $V_o$, function 606 of FIG. 6 represents such a theoretically increasing $V_o$ as a function of time. When the voltage at input 124 is greater than the voltage at input 126, switch 314 opens, and DCDC converter 400 operates in the closed loop mode.

If clamp resistor 316 is not used (there is very high impedance between the input 124 and input 126), the differential voltage at input 124 is much higher. As a result, when a DCDC converter (similar to DCDC converter 400, but without clamp resistor 316) switches to the closed loop mode, there is a large overshoot as shown by function 612. In this situation, the DCDC converter takes time to regulate $V_o$ so that the voltage at input 124 drops to be closer to the voltage at input 126.

Clamp resistor 316 in DCDC converter 400 decreases a threshold for the voltage at input 124. As a result, when DCDC converter 400 switches to the closed loop mode, there is no overshoot as shown by function 614, and the desired $V_o$ remains constant. In this situation, the voltage at input 124 drops remains close to the voltage at input 126, so there is no need for DCDC converter 400 to regulate $V_o$.

It may be easier to further explain the operation of DCDC converter 400, by describing the relationship between $V_o$, the inputs to comparator 304 and output current 412. This will now be described with reference to FIG. 7.

Figure 7:
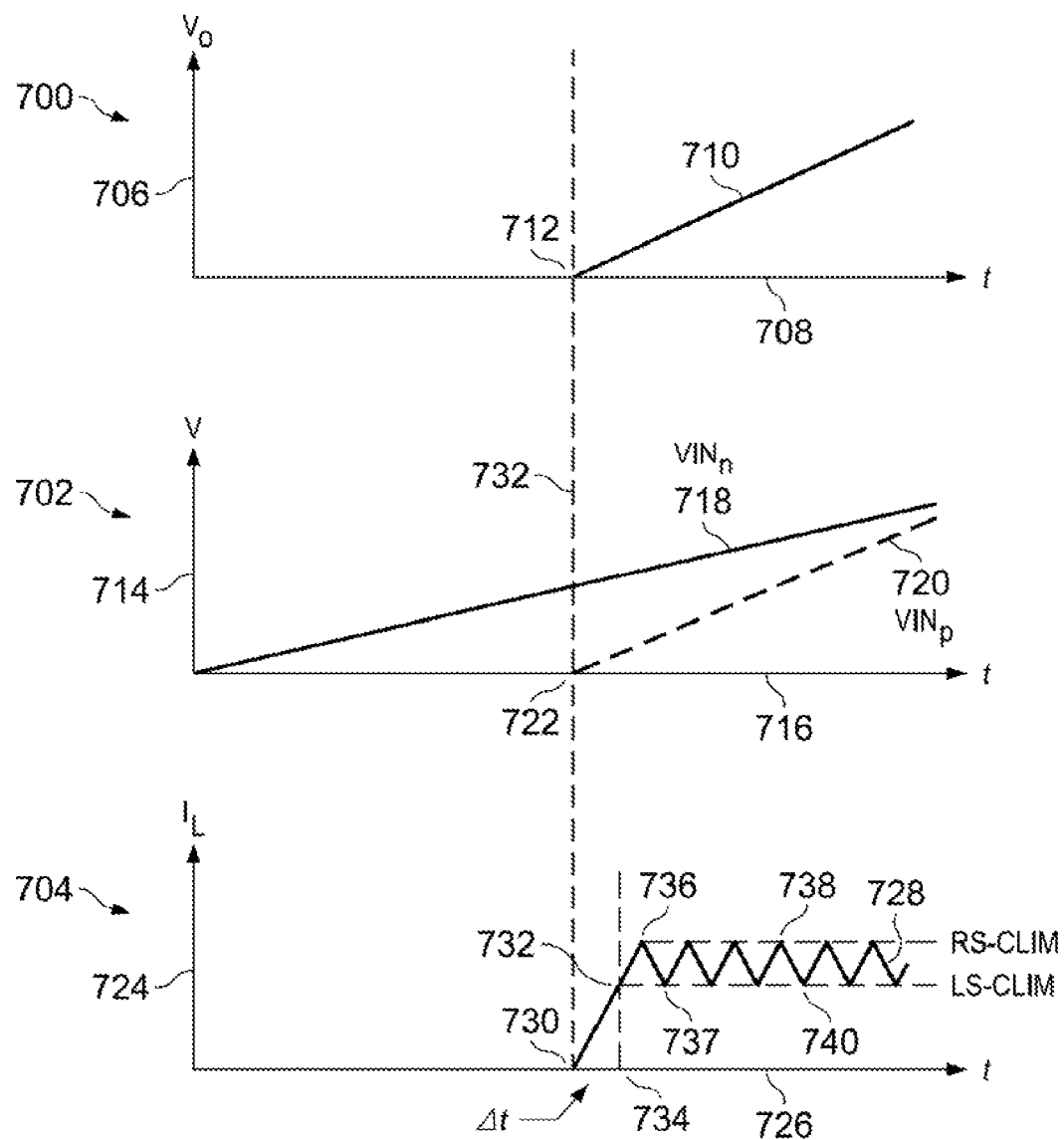
FIG. 7 shows a graph of the output voltage as function of time, a graph of voltage as a function of time, and a graph of current through an impedance element as a function of time.

FIG. 7 shows a graph 700 of $V_o$ as function of time, a graph 702 of voltage as a function of time, and a graph 704 of current $I_L$ through an impedance element as a function of time.

Graph 700 includes a y-axis 706, an x-axis 708 and a function 710. Y-axis 706 is in volts and corresponds to $V_o$ of DCDC converter 400 of FIG. 4. X-axis 708 corresponds to time and is in milliseconds. Function 710 corresponds to $V_o$ of DCDC converter 400 of FIG. 4 as a function of time. Graph 700 illustrates $V_o$ starting at the time indicated by point 712. This point in time is when DCDC converter 400 starts the open-loop mode. DCDC converter 400 operates in the closed-loop mode prior to point 712.

Graph 702 includes a y-axis 714, an x-axis 716, a function 718 and a function 720. Y-axis 714 is in volts and corresponds to $V_o$ of DCDC converter 400 of FIG. 4. X-axis 716 corresponds to time and is in milliseconds. Function 718 corresponds to the voltage at input 126 of DCDC converter 400 of FIG. 4 as a function of time, whereas function 720 corresponds to the voltage at input 124 of DCDC converter 400 of FIG. 4 as a function of time. Graph 702 shows that the voltage of input 126 starts to increase at time 0, or at startup, whereas the voltage of input 124 does not start to increase until some time later, as indicated at point 722. This point in time is when DCDC converter 400 starts the closed-loop mode. DCDC converter 400 operates in the open-loop mode prior to point 722.

Graph 704 includes a y-axis 724, an x-axis 726 and a function 728. Y-axis 724 is in milliamps and corresponds to current through output impedance component 406 to $V_o$ of FIG. 4. X-axis 726 corresponds to time and is in milliseconds. Function 728 corresponds to current through output impedance component 406 to $V_o$ as a function of time. Graph 704 shows that the $V_o$ starts to increase at time as indicated at point 730. Point 730 represents the start of the open-loop mode, as aligned with graphs 700 and 702 via dotted line 732. This point in time is when DCDC converter 400 starts the open-loop mode. DCDC converter 400 operates in a shutdown mode prior to point 730. Once started in the open-loop mode, the current through output impedance component 406 to $V_o$ starts to increase until it hits a maximum threshold output current as represented by point 736. This minimum current is reaches some time, Δt, as shown at point 734 on x-axis 726. The current then ramps down until it hits a minimum threshold output current as represented by point 737. The output current then oscillates between the maximum threshold output current as shown by dotted line 738 and the minimum threshold output current as shown by dotted line 740.

FIGS. 4-7 describe the operation of a general DCDC converter in accordance with aspects of the present invention.

Figure 8:
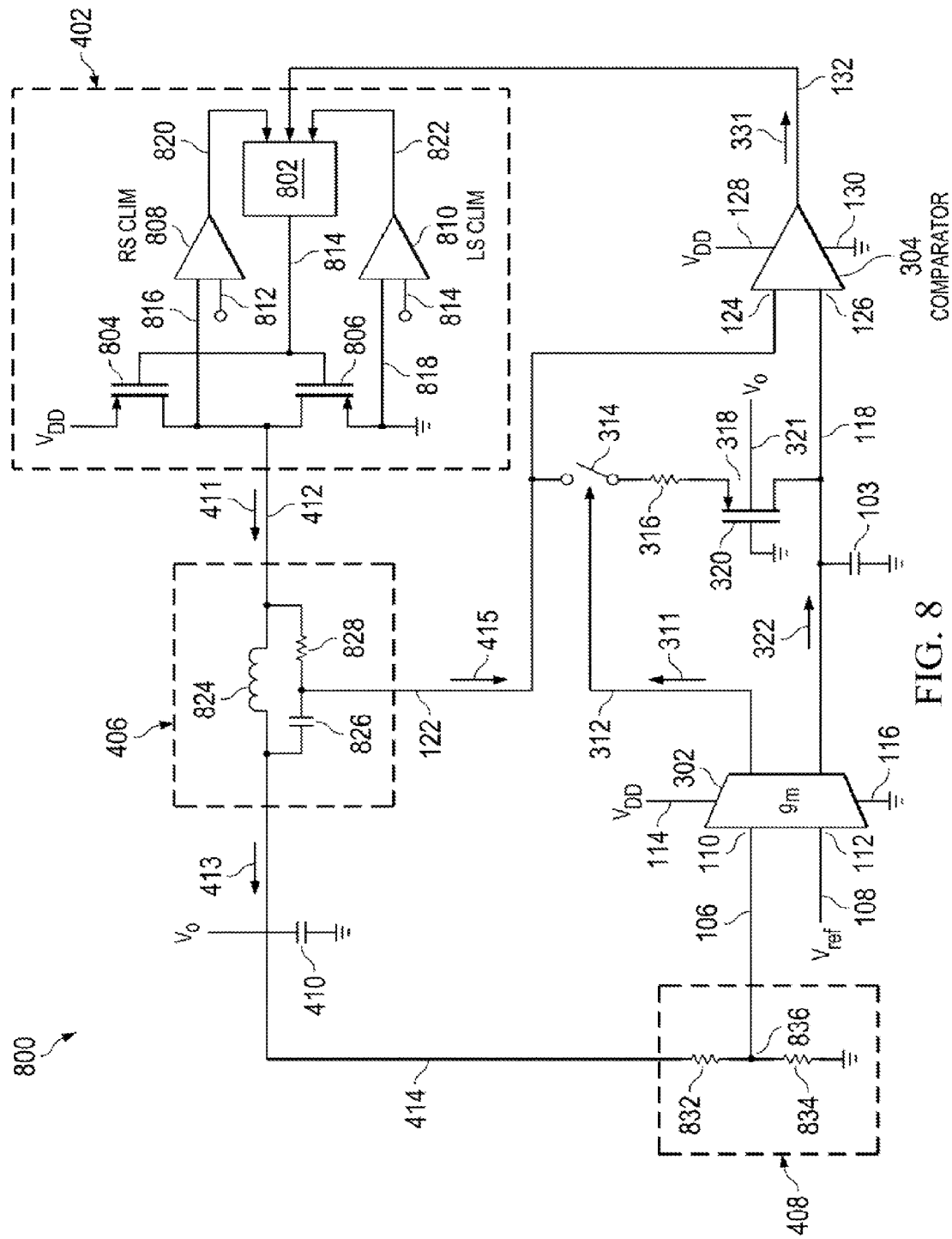
FIG. 8 illustrates another example DCDC converter in accordance with aspects of the present invention.

FIG. 8 illustrates another example DCDC converter 800 in accordance with aspects of the present invention. DCDC converter 800 corresponds to an example of DCDC converter 400 of FIG. 4, but includes specifics of an example current driving component 402, an example output impedance component 406 and an example attenuation component 408.

As shown in FIG. 8, current driving component 402 includes a driver 802, a switch 804, a switch 806, a high-side comparator 808, a low-side comparator 810, a high side reference voltage supply 812, and a low-side reference voltage supply 814. In this non-limiting example, switch 804 is a p-FET and switch 806 is an n-FET.

Driver 802 is arranged to receive compared signal 331 from comparator 304 via line 132 an output to a line 814. Line 814 is additionally connected to the gate of switch 804 and the gate of switch 806, such that the output of driver 802 is used to actuate each of switch 804 and switch 806.

Switch 804 is supplied by a voltage supply, $V_{DD}$, and outputs a signal to line 412. The output of switch 804 is additionally fed to high-side comparator 808 via a line 816. The output of switch 806 is fed to low-side comparator 810 via a line 818.

High-side comparator 808 is arranged to receive a first input from switch 804 via line 814, to receive a second input from high-side reference voltage supply 812, and to output a high-side comparison signal to driver 802 via a line 820. Low-side comparator 810 is arranged to receive a first input from switch 806 via line 818, to receive a second input from low-side reference voltage supply 814, and to output a low-side comparison signal to driver 802 via a line 822.

High-side comparator 808 monitors the current through switch 804, whereas low-side comparator 810 monitors the current through switch 806. In this example embodiment, switch 804, high-side comparator 808 and high-side reference voltage supply 812 establish the maximum threshold of the output current 411 through inductor 824. This maximum threshold corresponds to the maximum threshold output current as shown by dotted line 738 in graph 704 of FIG. 7. Similarly, in this example embodiment, switch 806, low-side comparator 810 and low-side reference voltage supply 814 establish the minimum threshold of the output current 411 through inductor 824. This minimum threshold corresponds to the minimum threshold output current as shown by dotted line 740 in graph 704 of FIG. 7.

The minimum and maximum thresholds may be changed by changing any combination of switch 804, switch 806, high-side reference voltage supply 812 and low-side reference voltage supply 814.

Impedance output component 406 includes an inductor 824, a capacitor 826 and a resistor 828. In this arrangement, capacitor 826 and resistor 828 are connected to $V_o$ and the node of switch 314, and are additionally parallel to inductor 824. Capacitor 826 and resistor 828 provide a signal that is in phase with current 411 through inductor 824.

In the open-loop mode, current 411 through inductor 824 is zero, such that $V_o$ is zero. Therefore, all the current passes through resistor 828 to generate a voltage at input 124 of comparator 304.

In the second phase of the 736 open-loop mode, current 411 is maximized through inductor 824.

Attenuation component 408 includes a resistor 832 and a resistor 834 arranged as a voltage divider. In this example, one lead of resistor 832 is arranged to receive $V_o$ via line 414, whereas the other lead of resistor 832 is connected to a node 836. One lead of resistor 834 is additionally connected to node 836, whereas the other lead of resistor 834 is connected to ground. The voltage generated at node 836 is provided to input 110 of transconductance amplifier 302 via line 106.

In operation, the voltage, $V_{110}$, provided to input 110 of transconductance amplifier 302 is calculated as:

$$V_{110} = R_{834}/(R_{832}+R_{834})*V_o, \quad (1)$$

Wherein $R_{834}$ is the resistance of resistor 834 and $R_{832}$ is the resistance of resistor 832. This is merely a non-limiting example embodiment of attenuation component 408. In another non-limiting example embodiment, an attenuation component operable to feed back the entire value of $V_o$ to transconductance amplifier 302 may be used. Still other non-limiting example embodiment may include any attenuation component that is operable to feed back an attenuated amount of $V_o$ to transconductance amplifier 302.

DCDC converter 800 of FIG. 8, while efficient and simplistic in design, is limited in operation. Other example DCDC converters may have variable parameters of operations. A few examples will now be described with reference to FIGS. 9-10.

Figure 9:
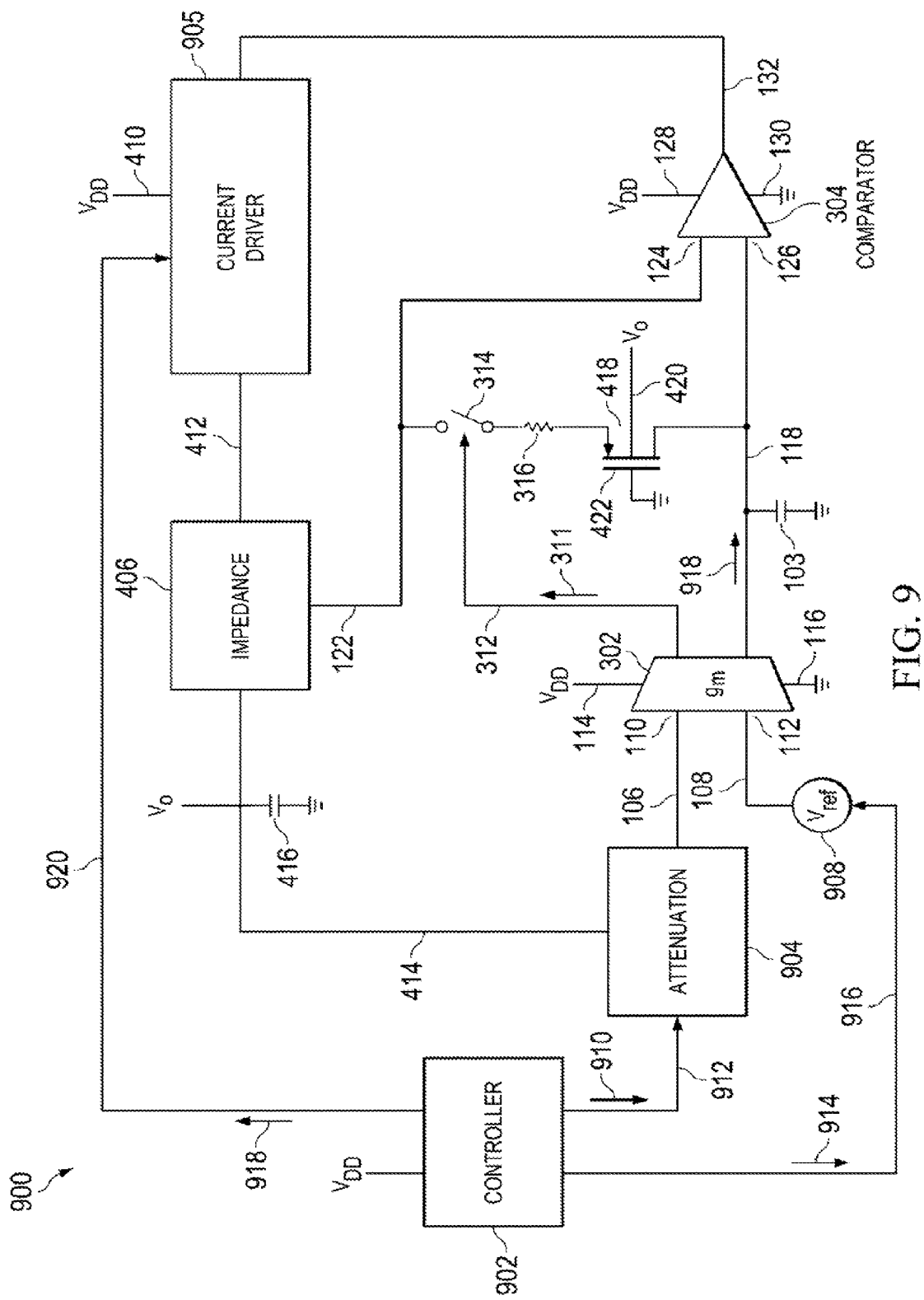
FIG. 9 illustrates another example DCDC converter in accordance with aspects of the present invention.

FIG. 9 illustrates another example DCDC converter 900 in accordance with aspects of the present invention.

DCDC converter 900 is similar to DCDC converter 800 of FIG. 8, but differs somewhat. In particular, attenuation component 408 of DCDC converter 800 is replaced with a variable attenuation component 904 in DCDC converter 900. Further, reference voltage $V_{ref}$ as provided to line 108 of DCDC converter 800, is replaced with a controllable reference voltage provider 908, which provides controllable reference voltage to line 108 in DCDC converter 900. Still further, current driver 905 of DCDC converter 800, is replaced with a controllable current driver 905, which provides controllable output current. Finally DCDC converter 900 additionally includes a controller 902.

Controller 902 is arranged and operable to provide an attenuation control signal 910 to variable attenuation component 904 via a line 912. Controller 902 is additionally arranged and operable to provide a reference control signal 914 to controllable reference voltage provider 908 via a line 916. Controller 902 is additionally arranged and operable to provide a reference control signal 918 to controllable current driver 905 via a line 920.

A user (not shown) may interface with controller by any known system or method so as to establish any one of a desired $V_o$ or a desired $V_{DD}/V_o$. Controller may have a memory therein, wherein parameters are stored for each possible desired $V_o$ or a desired $V_{DD}/V_o$ that DCDC converter 900 may support. These stored parameters include the amount of attenuation needed by variable attenuation component 904, the $V_{ref}$ needed to be supplied by controllable reference voltage provider 908, and the upper and lower reference voltages for current driver 905.

Variable attenuation component 904 is operable to provide a variable attenuation of $V_o$ to input 110 of transconductance amplifier 302. Controllable reference voltage provider 908 is operable to provide a variable reference voltage to input 112 of transconductance amplifier 302. Variable current driver 905 is operable to provide an output current between variably controlled upper and lower limits. Controller 902 is operable to control the attenuation provided by variable attenuation component 904 and to control the voltage provided by controllable reference voltage provider 908.

In operation, a user may choose a specific desired $V_o$ or a desired $V_{DD}/V_o$. Controller 902 may then determine the amount of attenuation needed by variable attenuation component 904, the $V_{ref}$ needed to be supplied by controllable reference voltage provider 908, and the upper and lower reference voltages for current driver 905 in order to obtain the user desired $V_o$ or a desired $V_{DD}/V_o$. Controller 902 may then instruct the components accordingly. With instructions from controller 902; variable attenuation component 904 may provide the required amount of attenuation; controllable reference voltage provider 908 may provide the required $V_{ref}$ and current driver 905 may provide the upper and lower reference voltages in order to obtain the user desired, or a desired $V_{DD}/V_o$. At that point, DCDC converter 900 may operate in a manner similar to DCDC converter 400.

DCDC converter 900 of FIG. 9, may have variable parameters of operations. However, it is not unlimited in operation. For example, any particular FET therein may be limited in the amount of current or voltage it can safely handle. Aspects of the present invention may be stacked, so as to increase the overall DCDC conversion ability. This will now be described in greater detail with reference to FIG. 10.

Figure 10:
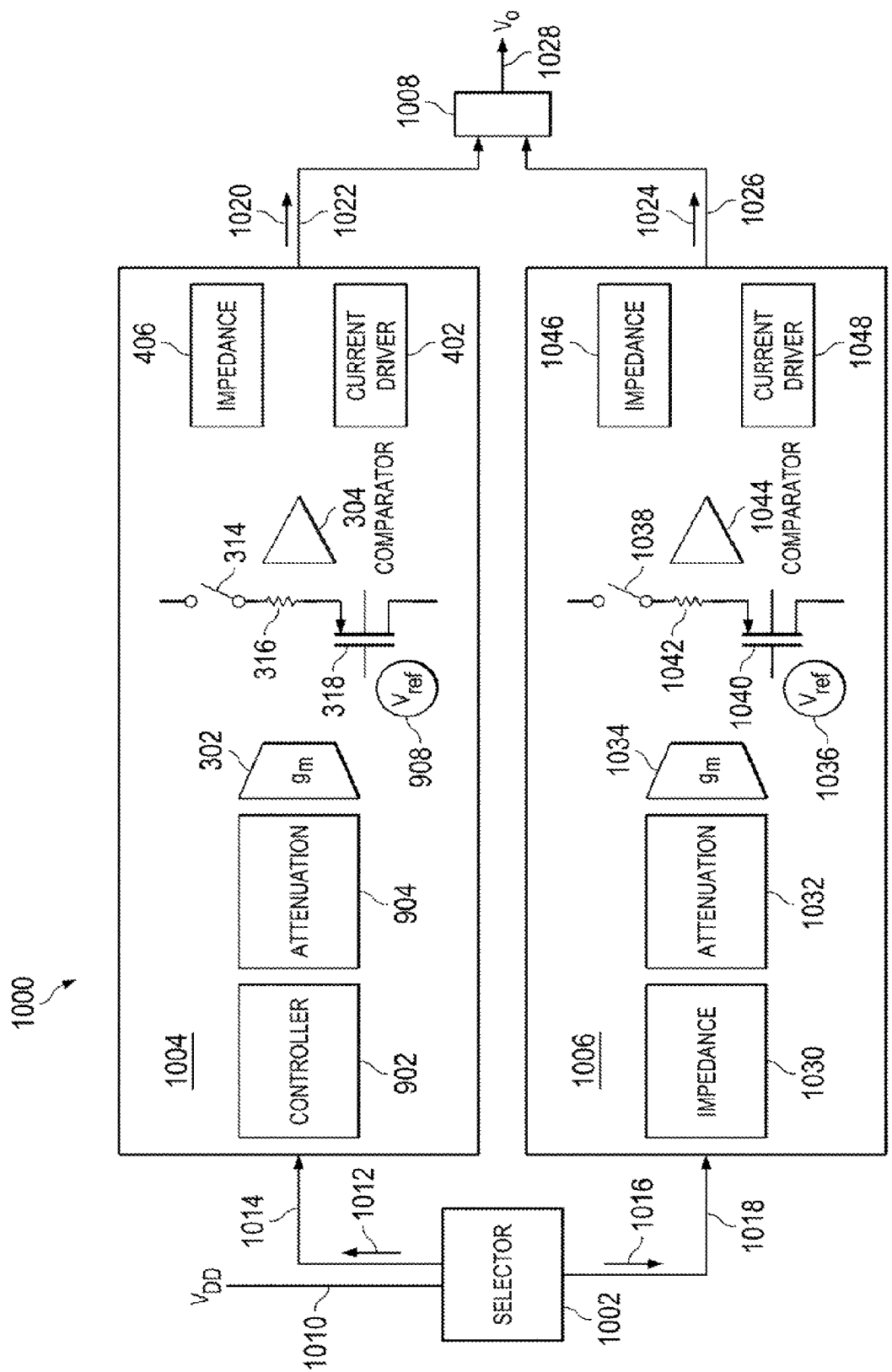
FIG. 10 illustrates another example DCDC converter in accordance with aspects of the present invention.

FIG. 10 illustrates another example DCDC converter 1000 in accordance with aspects of the present invention.

As shown in the figure, DCDC converter 1000 includes a selector 1002, a DCDC component 1004, a DCDC component 1006 and an OR gate 1008. DCDC component 1004 includes all the elements of DCDC converter 900 of FIG. 9. DCDC component 1005 includes similar elements arranged in a similar to manner to those of DCDC converter 900 of FIG. 9, as will be explained in more detail below.

Selector 1002 is arranged to receive a supply voltage $V_{DD}$ from a line 1010, is operable to output a select signal 1012 via a line 1014 to DCDC component 1004, and is operable to output a select signal 1016 via a line 1018 to DCDC component 1006. DCDC component 1004 is operable to output an output voltage signal 1020 via a line 1022 to OR gate 1008. DCDC component 1006 is operable to output an output voltage signal 1024 via a line 1026 to OR gate 1008. OR gate 1008 is operable to output an output voltage $V_o$ via a line 1028.

With a DCDC converter that includes a transconductance amplifier-driven comparator in accordance with aspects of the present invention, only one additional minimum size p-FET in series with a clamp resistor is needed. Further, the silicon area and circuit complexity is minimized with just one small p-FET, as compared to complex conventional systems that include a complementary differential pair in the comparator. Still further, the p-FET in series with the clamp resistor provides a smooth transition from startup (open-loop) into normal (closed-loop) operation. The performance of the n-FET input differential pair of the comparator is not changed (e.g., the gain remains the same) in startup and in normal operation. The comparator having a single input differential pair may be better optimized in propagation delay and current consumption than a conventional comparator having a differential pair of p-FETs and a differential pair of n-FETs. Furthermore, in accordance with aspects of the present invention, because there is only a single input differential pair in the comparator, there is no additional current path, which is important for ultra low quiescent current IQ DCDC converters.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A DCDC converter operable to receive an input DC voltage and to generate an output DC voltage based on the received input DC voltage, said DCDC converter comprising:

a transconductance amplifier operable to output a transconductance current and a switch control signal, the transconductance current being based on a comparison of a portion of the output DC voltage and a predetermined reference voltage;

a comparator having a first n-channel field effect transistor input and a second n-channel field effect transistor input, said first n-channel field effect transistor input and said second n-channel field effect transistor input forming a differential pair, said comparator being operable to output a compared signal based on a first input voltage received at said first n-channel field effect transistor input and a second input voltage received at said second n-channel field effect transistor input;

a current driving component operable to generate an output current based on the compared signal;

an output impedance component arranged to generate the output DC voltage based on the output current;

a switch arranged between said first n-channel field effect transistor input and said second n-channel field effect transistor input, said switch being operable to open and close based on the switch control signal; and a clamp resistor arranged in series with said switch and arranged between said first n-channel field effect transistor input and said second n-channel field effect transistor input; and a p-channel field effect transistor arranged in series with said clamp resistor and arranged between said first n-channel field effect transistor input and said second n-channel field effect transistor input, said p-channel field effect transistor being controlled by the output DC voltage.

2. The DCDC converter of claim 1, further comprising an attenuation component operable to attenuate the output DC voltage to generate the portion of the output DC voltage.

3. The DCDC converter of claim 2, wherein said attenuation component comprises a first resistor and a second resistor arranged as a voltage divider.

4. The DC/DC converter of claim 3, wherein said p-channel field effect transistor comprises a gate and a back gate.

5. The DC/DC converter of claim 4,
wherein said gate is connected to ground, and
wherein said back gate is connected the output DC voltage.

6. The DC/DC converter of claim 2, wherein said p-channel field effect transistor comprises a gate and a back gate.

7. The DC/DC converter of claim 6,
wherein said gate is connected to ground, and
wherein said back gate is connected the output DC voltage.

8. The DCDC converter of claim 1, further comprising:
a controller operable to generate an attenuation control signal,
wherein said attenuation component comprises a controllable attenuation component operable to attenuate the output DC voltage to generate the portion of the output DC voltage based on the attenuation control signal.

9. The DCDC converter of claim 8, further comprising:
a reference voltage generating component operable to provide the reference voltage,
wherein said controller is further operable to generate a reference control signal, and
wherein said reference voltage generating component is operable to provide the reference voltage based on the reference control signal.

10. The DC/DC converter of claim 9, wherein said p-channel field effect transistor comprises a gate and a back gate.

11. The DC/DC converter of claim 10,
wherein said gate is connected to ground, and
wherein said back gate is connected the output DC voltage.

12. The DC/DC converter of claim 8, wherein said p-channel field effect transistor comprises a gate and a back gate.

13. The DC/DC converter of claim 12,
wherein said gate is connected to ground, and
wherein said back gate is connected the output DC voltage.

14. The DCDC converter of claim 1, further comprising:
a second comparator having a second first n-channel field effect transistor input and a second second n-channel field effect transistor input, said second first n-channel field effect transistor input and said second second n-channel field effect transistor input forming a differential pair, said second comparator being operable to output a second compared signal based on a second first input voltage received at said second first n-channel field effect transistor input and a second second input voltage received at said second second n-channel field effect transistor input;
a second clamp resistor arranged between said second first n-channel field effect transistor input and said second second n-channel field effect transistor input;
a second switch arranged between said second first n-channel field effect transistor input and said second second n-channel field effect transistor input, said second switch being operable to open and close based on the switch control signal;
a second p-channel field effect transistor arranged between said second first n-channel field effect transistor input and said second second n-channel field effect transistor input, said second p-channel field effect transistor being controlled by the output DC voltage.

15. The DC/DC converter of claim 1, wherein said p-channel field effect transistor comprises a gate and a back gate.

16. The DC/DC converter of claim 15,
wherein said gate is connected to ground, and
wherein said back gate is connected the output DC voltage.

17. A circuit having a transconductance amplifier and a comparator, the comparator having a first input and a second input, the transconductance amplifier providing a current for the second input of the comparator, wherein the improvement comprises:
a p-channel field effect transistor arranged between the first input and the second input,
wherein the first input comprises a first n-channel field effect transistor, wherein the second input comprises a second n-channel field effect transistor,
wherein said first n-channel field effect transistor and said second n-channel field effect transistor form a differential pair;
further comprising a switch operable to be controlled via said transconductance amplifier.

18. The circuit of claim 17, wherein the improvement further comprises a clamp resistor.

19. The circuit of claim 18,
wherein said resistor is disposed between said switch and said p-channel field effect transistor.

* * * * *